No. 715,102. Patented Dec. 2, 1902.
P. MARTIN.
SAND GUARD FOR JOURNAL BOXES.
(Application filed Dec. 10, 1901.)
(No Model.) 2 Sheets—Sheet 1.
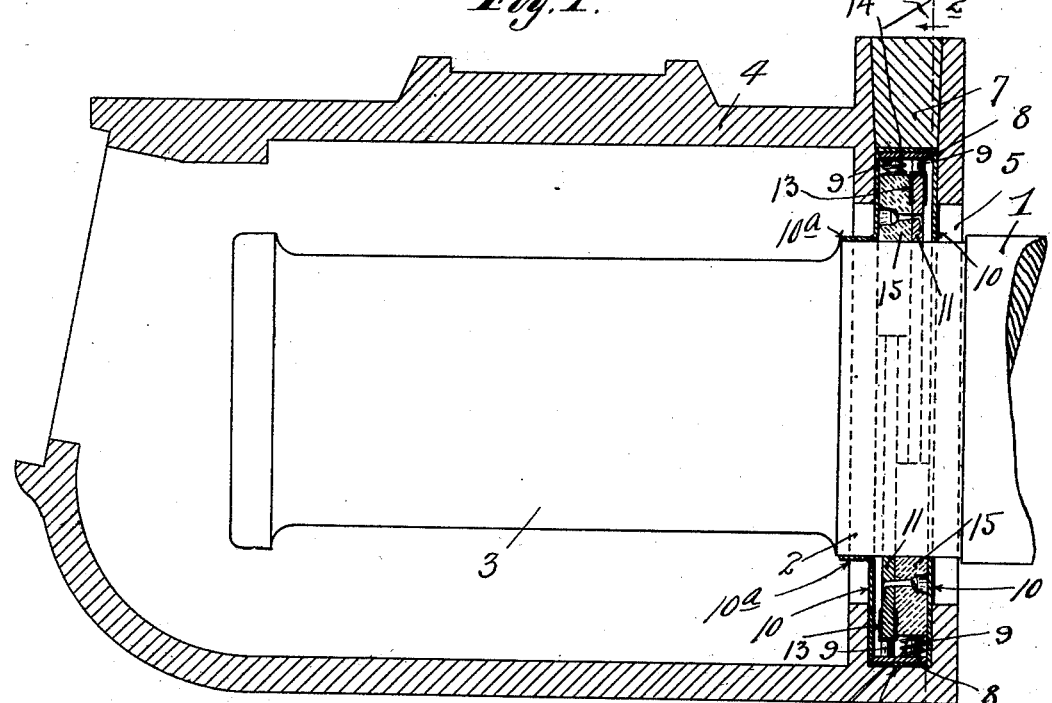
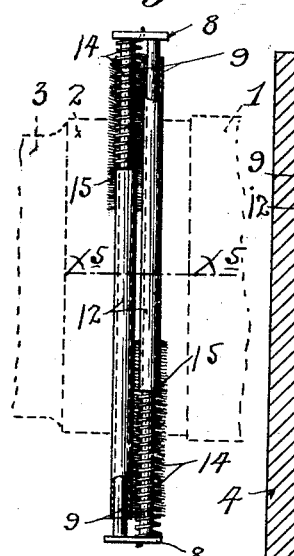
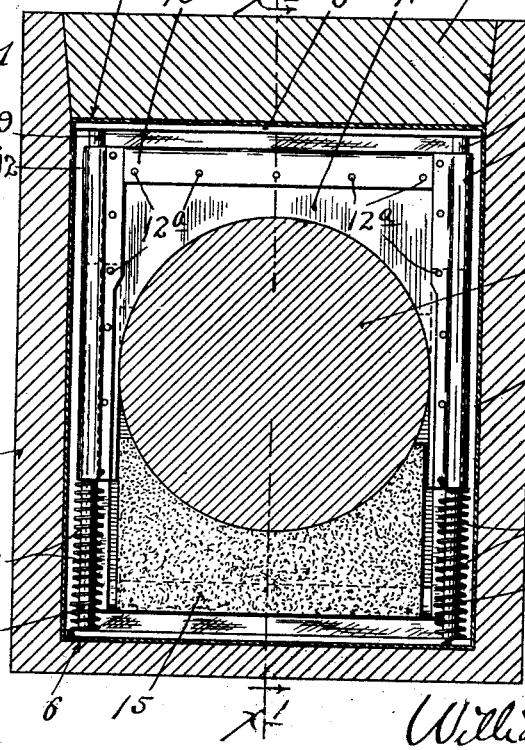
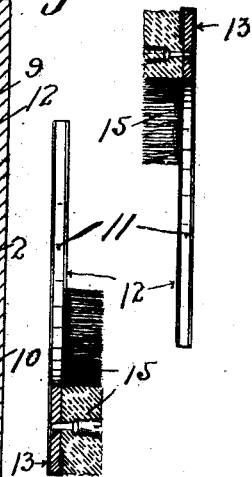
Witnesses
H. S. Klyne
A. H. Opsahl
Inventor
Peter Martin
By his Attorneys
Williamson & Merchant

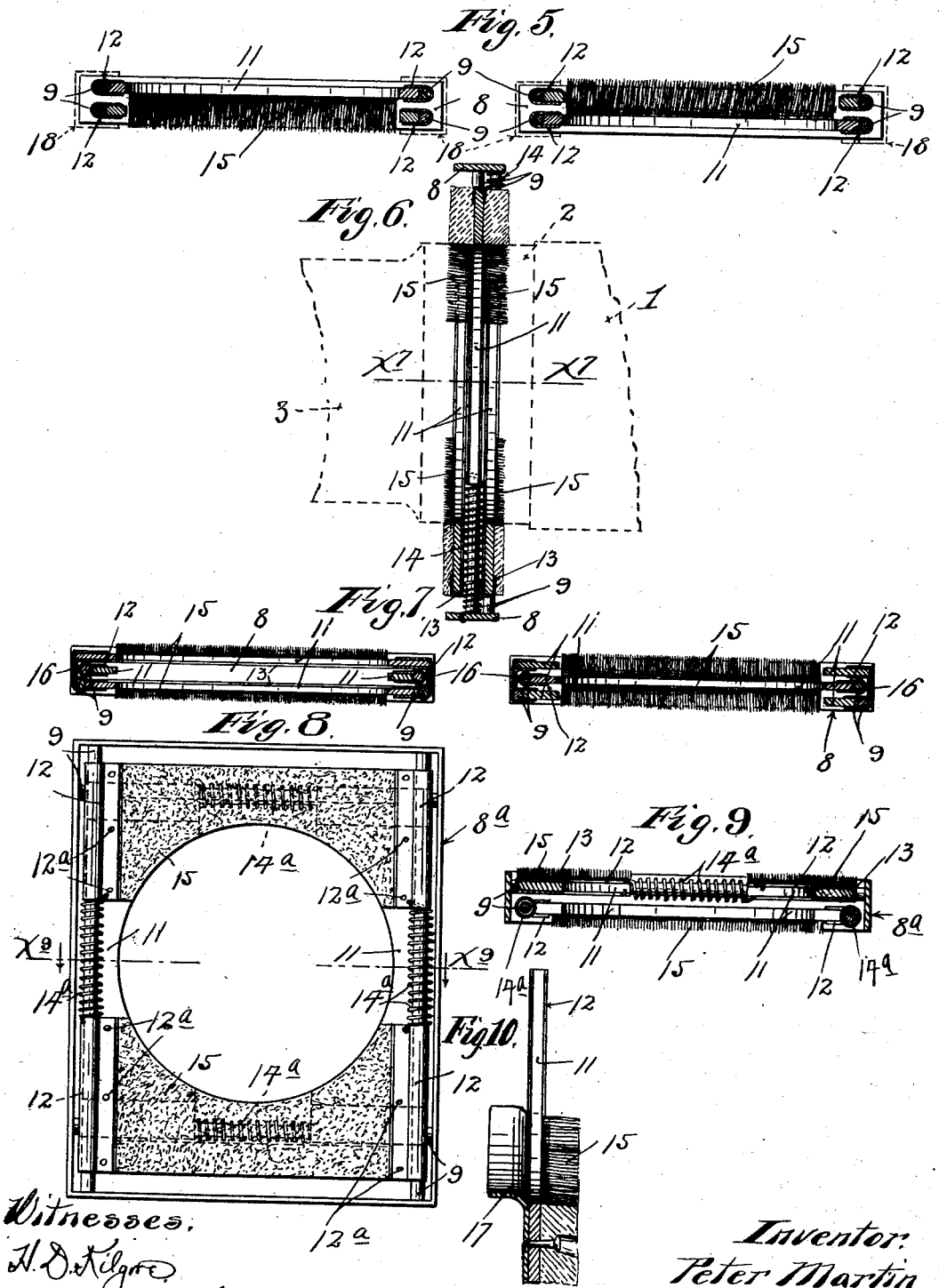

UNITED STATES PATENT OFFICE.

PETER MARTIN, OF ST. PAUL, MINNESOTA, ASSIGNOR, BY DIRECT AND MESNE ASSIGNMENTS, TO THE ST. PAUL MANUFACTURING CO., OF ST. PAUL, MINNESOTA, A CORPORATION OF MINNESOTA.

SAND-GUARD FOR JOURNAL-BOXES.

SPECIFICATION forming part of Letters Patent No. 715,102, dated December 2, 1902.

Application filed December 10, 1901. Serial No. 85,333. (No model.)

*To all whom it may concern:*

Be it known that I, PETER MARTIN, a citizen of the United States, residing at St. Paul, in the county of Ramsey and State of Minnesota, have invented certain new and useful Improvements in Sand-Guards for Journal-Boxes; and I do hereby declare the following to be a full, clear, and exact description of the invention, such as will enable others skilled in the art to which it appertains to make and use the same.

My present invention relates to dust-guards for excluding dust and sand from the oil-boxes of car-journals, and has for its object to improve the same in the several particulars hereinafter noted.

To the above ends the invention consists of the novel devices and combinations of devices hereinafter described, and defined in the claims.

The invention is illustrated in the accompanying drawings, wherein like characters indicate like parts throughout the several views.

Figure 1 is a transverse vertical section taken centrally through a car-journal on the line $x'\ x'$ of Fig. 2, some parts being shown in full and others being broken away. Fig. 2 is a vertical section on the line $x^2\ x^2$ of Fig. 1. Fig. 3 is a side elevation showing in detail the internal mechanism of one of the guards, its position on the axle being indicated by dotted lines. Fig. 4 is a transverse vertical section showing in detail a pair of coöperating wearing-strips and their pliable facings. Fig. 5 is a section on the line $x^5\ x^5$ of Fig. 3, the upper section of the device being shown as turned upside down toward the right. Fig. 6 is a view corresponding in the line of its section to Fig. 1, but illustrating a modified construction. Fig. 7 is a view corresponding to Fig. 5, but taken on the line $x^7\ x^7$ of Fig. 6. Fig. 8 is a view corresponding in the line of its section to Fig. 2, but illustrating still another modified construction and showing the device removed from its seat in the oil-box. Fig. 9 is a horizontal section on the line $x^9\ x^9$ of Fig. 8, and Fig. 10 is a vertical section showing in detail one of the wearing-plates used in the construction illustrated in Figs. 8 and 9.

The numeral 1 indicates the car-axle, having a slightly-reduced portion 2 and a still further reduced journal portion 3.

The numeral 4 indicates the oil-box, which is formed at its inner end with an axle-passage 5 and a seat 6, which seat is open at its upper end and is adapted to receive a plug-strip 7. The "bearing-brass," which would be of the ordinary construction, is not shown in the drawings.

My improved sand-guard is adapted to take several different forms, some of which are illustrated in the drawings. In its simplest form (illustrated in Figs. 1 to 5, inclusive) the construction is preferably as follows: As a support and guide for the movable parts of the guard I provide a rectangular frame, preferably made up of top and bottom bars 8 and vertical guide-rods 9, the latter of which are arranged in parallel pairs, two at each side of the frame. This frame 8 9 fits loosely within the seat 6 at the inner end of the oil-box 4 and is held in place by the plug-strip 7. The axle is adapted to be passed through this frame 8 9, and said frame is in this form of the device covered with canvas or other flexible material, as best indicated in Fig. 1 by the numeral 10. This canvas covering 10 is perforated at its sides, so that it closely engages the surface 2 of the axle, and one of the said sides is preferably provided with a cylindrical flap $10^a$. Wearing-plates 11, preferably of heavy leather, are cut at their inner edges to closely fit the axle-surface 2 and form a tight joint therewith. These wearing-plates 11 are set laterally out of line with each other, one above and the other below the axle, and are provided at their vertical edges with sleeve-like keeper-strips 12, which work freely on the transversely-opposite guide-rods 9. These sleeves 12 stiffen the vertical edges of the wearing-strips 11, and the horizontal metal binding-strips 13 further stiffen the horizontal edges of said plates. Coiled springs 14, placed on the rods 9, are connected to the ends of the sleeves 12 and to the adjacent bars 8, and thereby serve to yieldingly draw the wearing-plates 11 into contact with the axle-surface 2. The lower plate 11 has secured to it a facing of heavy carpet 15 or similar material having a long nap, the nap of which facing projects outward and bears against the outer wall of the canvas covering 10. The upper plate 11 is likewise provided with a similar facing of carpet or similar material the nap of which bears against the inner wall of the said canvas cover 10. If the canvas cover 10 were to be omitted, the nap or outer surfaces of the pliable facings 15 would bear against the metal walls of the seat 6 and in this case, as well as in the construction above described, serve to exclude all dust or gravel from the oil-box.

The construction illustrated in Figs. 6 and 7 is very similar to that above described; but in this construction two wearing-plates 11 are placed below the axle and one above, the upper plate 11 being spaced to work between the two lower plates. One of the lower plates 11 is mounted to move on one of the pairs of guide-rods 9, as in the construction above described, but in this modification is provided with projecting brackets 16, which carry the twin member or other lower plate 11, as best shown in Fig. 7. The two lower plates 11 are provided on their opposite faces with the carpet facings 15, which fill or closely fit between the walls at the lower extremity of the seat 6, the canvas covering in this modification not being employed. The upper wearing-plate 11 is, furthermore, provided on both faces with the carpet facings 15, which are of such thickness as to closely fit between the walls at the upper portion of the seat 6.

Still another modification is illustrated in Figs. 8, 9, and 10. In this modification two pairs of wearing-plates 11 are employed, the members of one pair being mounted to work or move vertically, while the members of the other pair work horizontally. All of the said plates, however, are of course set in vertical planes. One pair of rods 9 are extended vertically and the other horizontally and all are secured at their ends within a rectangular frame $8^a$. The coöperating members of a given pair of the wearing-plates 11 work in the same vertical plane, and their guide-sleeves 12 work on the same pair of rods 9. The sleeves of said coöperating members are yieldingly drawn together by coiled springs $14^a$, connected thereto at their ends and wound on the said rods 9. The wearing-plates 11 of this construction are, as in the constructions above described, provided with facings 15, of carpet or similar material, and they are also preferably provided with flexible packing-strips 17 of soft leather, canvas, or other suitable material, as shown in Fig. 10. For many purposes this latter-described construction is preferable to the other forms described. It takes up no more room than the device shown in Figs. 1 to 5, inclusive, and the four coöperating wearing-plates always closely engage the axle at all points of its circumference, thus making material leakage of dust between the same and the said axle an impossibility.

As another modification I might, in connection with the form illustrated in Figs. 1 to 5, inclusive, dispense with the canvas covering 10 and provide vertical guard-strips 18 of channel form, as best shown in Fig. 5 by dotted lines. These guard-strips would extend from the lower to the upper bars 8 and be suitably secured thereto. When thus applied, they would serve to prevent the rough side of the seat 6 from coming in contact with the springs.

It will of course be understood that the guard above described is capable of modifications other than those above described, but all within the scope of my invention as herein claimed.

The so-called "wearing-plates" 11 and 15, being formed of leather, are quite pliable, so that they will give in case they are forced against anything acting as a stop thereto. The flanges of the so-called "keeper-sleeves" 12 are preferably not riveted to the wearing-plates. They are simply clenched onto the same and provided with indentations $12^a$, which assist in holding the flanges in position on the edges of the said plates. This permits a worn-out wearing-plate to be easily removed and a new plate substituted therefor.

What I claim, and desire to secure by Letters Patent of the United States, is as follows:

1. A dust-guard for journal-boxes involving a rectangular frame having pairs of parallel guide-rods set in different parallel planes, and a pair of spring-pressed reversely-acting wearing-plates held and guided for movement in parallel offset planes, one by each of said pairs of guide-rods, substantially as and for the purposes set forth.

2. The combination with an oil-box and an axle, the former having a seat 6 at one extremity, of a rectangular frame fitting within said seat 6 and involving two pairs of parallel guide-rods, wearing-plates fitting the axle and mounted one on each pair of guide-rods for movement in different but parallel planes, springs yieldingly pressing said wearing-plates onto the axle, and pliable facings on said wearing-plates projecting in opposite directions and forming dust-tight joints with the side walls of said seat 6, substantially as described.

3. The combination in a dust-guard, of a rectangular frame having rigid and parallel guide-rods and transverse tie-bars to which said guide-rods are rigidly secured at their ends, wearing-plates cut to fit the axle, keepers slidable on said guide-rods and having flanges which embrace and hold said wearing-plates, and springs for yieldingly holding said wearing-plates against the axle, substantially as described.

4. A dust-guard for journal-boxes involving a frame, two pairs of reversely-acting wearing-plates mounted on said frame, said pairs working in different planes and movable approximately at right angles the one to the other and completely encircling the axle, substantially as described.

In testimony whereof I affix my signature in presence of two witnesses.

PETER MARTIN.

Witnesses:
ELIZABETH KELIHER,
F. D. MERCHANT.